(12) United States Patent
Ling et al.

(10) Patent No.: US 7,567,809 B2
(45) Date of Patent: Jul. 28, 2009

(54) PRESERVING HTTP SESSIONS IN HETEROGENEOUS WIRELESS ENVIRONMENTS

(75) Inventors: Yibei Ling, Belle Mead, NJ (US); Wai Chen, Parsippany, NJ (US); Onur Altintas, Florham Park, NJ (US)

(73) Assignees: Telcordia Technologies, Inc., Piscataway, NJ (US); Toyota Motor Corporation (JP)

( * ) Notice: Subject to any disclaimer, the term of this patent is extended or adjusted under 35 U.S.C. 154(b) by 0 days.

(21) Appl. No.: 11/384,590

(22) Filed: Mar. 20, 2006

(65) Prior Publication Data

US 2006/0200559 A1 Sep. 7, 2006

Related U.S. Application Data

(63) Continuation of application No. 10/772,482, filed on Feb. 5, 2004.

(51) Int. Cl.
*H04M 3/00* (2006.01)
*H04W 36/00* (2009.01)
*H04W 24/00* (2009.01)
*H04W 4/00* (2009.01)
*H04J 3/16* (2006.01)

(52) U.S. Cl. .................... 455/436; 455/418; 455/437; 455/440; 455/443; 455/456.1; 370/331; 370/346

(58) Field of Classification Search ... 455/432.1–432.3, 455/435.1, 435.2, 63.2–63.3, 456.1–456.3, 455/456.5–456.6, 418–421, 516–517, 550.1, 455/556.1, 556.2, 557–558, 560–561, 433–434, 455/422.1, 424–425, 466, 404.2, 436–437, 455/440, 443, 448, 522, 552.1, 553.1; 370/328–334, 370/338, 346, 348, 400, 395.5, 395.52, 395.53, 370/401–402; 709/203, 242, 218–219, 228–229
See application file for complete search history.

(56) References Cited

U.S. PATENT DOCUMENTS

| | | | |
|---|---|---|---|
| 6,480,957 B1 | 11/2002 | Liao et al. | 713/170 |
| 6,591,103 B1 * | 7/2003 | Dunn et al. | 455/436 |
| 6,748,056 B1 * | 6/2004 | Capriotti et al. | 379/88.17 |
| 6,826,154 B2 | 11/2004 | Subbiah et al. | 370/236 |
| 6,829,481 B2 * | 12/2004 | Souissi | 455/436 |
| 6,842,621 B2 | 1/2005 | Labun et al. | 455/456.3 |
| 7,003,571 B1 * | 2/2006 | Zombek et al. | 709/227 |
| 2002/0046299 A1 * | 4/2002 | Lefeber et al. | 709/318 |
| 2002/0082015 A1 * | 6/2002 | Wu | 455/436 |
| 2002/0085528 A1 | 7/2002 | Reza et al. | 370/338 |
| 2002/0138599 A1 * | 9/2002 | Dilman et al. | 709/223 |
| 2002/0156881 A1 | 10/2002 | Klopp Lemon et al. | 709/224 |
| 2002/0165909 A1 | 11/2002 | Martin et al. | 709/203 |
| 2003/0037131 A1 | 2/2003 | Verma | 709/223 |
| 2003/0046362 A1 | 3/2003 | Waugh et al. | 709/218 |
| 2003/0093341 A1 * | 5/2003 | Millard et al. | 705/34 |
| 2003/0145038 A1 | 7/2003 | Bin Tariq et al. | 709/202 |
| 2003/0204599 A1 | 10/2003 | Trossen et al. | 709/227 |
| 2004/0067754 A1 * | 4/2004 | Gao et al. | 455/442 |
| 2004/0133563 A1 | 7/2004 | Harvey et al. | 707/3 |
| 2004/0137901 A1 | 7/2004 | Hamasaki et al. | 455/436 |

* cited by examiner

*Primary Examiner*—Meless N Zewdu
(74) *Attorney, Agent, or Firm*—Philip J. Feig (57) ABSTRACT

Wireless internet in the in-vehicle environment is an evolving reality that reflects the gradual convergence of wireless and internet technologies. The present invention provides an application layer system that makes wireless internet access adaptive to dynamically changing heterogeneous network environments, by stressing carrier-independence and access transparency. To achieve these objectives, the present invention provides the following features: HTTP session continuity and automatic HTTP failure recovery; network environment awareness and application-level preemptive handoff based on bandwidth capacity.

13 Claims, 9 Drawing Sheets

PRESERVING HTTP SESSIONS IN HETEROGENEOUS WIRELESS ENVIRONMENTS

CROSS-REFERENCE TO RELATED APPLICATIONS

This application is a continuation of pending U.S. patent application Ser. No. 10/772,482, filed Feb. 5, 2004.

FIELD OF THE INVENTION

The present invention relates to an application layer system that makes wireless internet access adaptive to dynamically changing heterogeneous network environments, by stressing network environment awareness and adaptation and transparent failure recovery.

BACKGROUND

The convergence of wireless and internet technologies has significantly changed the ways of using the internet and spurred the demand for a wide range of telematics applications.

The coexistence of various cellular networks such as CDMA, CDPD, GSM, and wireless LAN IEEE 802.11a/b/g offer a powerful mobile computing platform that supports mobility, completely freeing portable devices, such as laptop computers, personal digital assistants (PDA), cellular phones, etc. from being tethered with a wired connection. This convergence of technologies has created mobility and flexibility but has also introduced new problems that need scalable and feasible solutions.

The complexity of in-vehicle wireless internet stems from dynamically changing network environments and network heterogeneity. In an in-vehicle environment, a mobile host (MH) roams between base stations and switches coverage responsibility from one base station to another. The switch between base stations and networks is called a handoff and causes the MH to be temporarily disconnected. This is considered the primary source of dropped connections and performance deterioration. Handoff falls into two distinct categories; horizontal handoff and vertical handoff. A horizontal handoff refers to a switch between networks in a homogeneous network environment. A vertical handoff refers to a switch between networks in a heterogeneous network environment.

Existing wireless network technologies can be grouped into two distinct categories in terms of bandwidth capacity and coverage range; i.e. low-bandwidth connectivity over a wide geographic range and high-bandwidth connectivity over a narrow geographic range. A MH with multiple network interfaces is capable of connecting to different wireless networks simultaneously when the MH happens to be in an overlapping coverage area of the different wireless networks. Generally, when a MH initiates a session (TCP or UDP) over a low-bandwidth network with wide coverage range and then moves into an overlapping area of a high-bandwidth network with narrow coverage range, the MH continues with the low-bandwidth network despite the higher bandwidth availability. This is a because of the historical dependence of network access, a phenomenon known as network hysteresis. Clearly, network hysteresis has an adverse impact on system throughput, impairing system performance.

Problems related to HTTP session continuity in a heterogeneous wireless environment have not been widely studied. This is especially true for in-vehicle applications. This lack of study may be attributed to the obvious risk of driving while web surfing among other factors. However, the emergence of new telematics applications, especially, a variety of rear-seat applications, make this a technology area worth exploring.

A review of related work on session continuity with a focus on Mobile IP (MIP) and Session Initiation Protocol (SIP) is warranted. Initially, a distinction between two levels of granularity of HTTP session continuity is provided by the following terms; transaction-level granularity and packet-level granularity.

At transactional-level granularity, a HTTP session is indivisible for a given point of attachment. This means a HTTP session cannot be partially successful. This results in inefficiency of network utilization because a failure recovery requires that a file be downloaded from scratch. Frequent handoffs could result in frequent failure recovery, forming an endless loop of downloading of the same file. This represents a serious detriment for mobile wireless applications.

At packet-level granularity, a HTTP session is divisible with respect to the point of attachment, and can be pieced together via different points of attachment. This means that a file does not need to be restarted from scratch upon failure. This improves network utilization and is an important feature needed to optimize the over-the-air efficiency in highly mobile and heterogeneous wireless network environments.

MIP is a network-layer approach for dealing with mobility and session continuity in a mobile environment and is implemented via IP-in-IP encapsulation, IP tunneling, and IP decapsulation. Using a MIP scheme, a MH is assigned both a fixed IP (primary IP) or home address and also a care-of address that may be changed for different points of attachment. In particular, when the MH moves into a foreign network coverage area and connects to such foreign network, a care-of address is assigned for that foreign network This care-of address is registered with the home agent (HA) in the home network. The HA is responsible for tunneling IP packets by performing IP-in-IP encapsulation to a foreign agent (FA) in the foreign network, and the FA is responsible for decapsulating the packet and delivering it to the MH.

One advantage of a MIP scheme is that the device home IP address does not have to be changed each time it connects to a foreign network. Further, MIP is attractive because it is application transparent. However, these benefits comes at a price; i.e. MIP requires performing run-time IP encapsulation and decapsulation for each IP packet, and introduces costly triangle routing, as well as an additional delay between HA and FA.

Session Initiation Protocol (SIP) is a standard application-layer signaling protocol and is widely considered as a replacement of H.323 protocol for multimedia streaming and various UDP-based applications such as 3 Internet conferencing, telephony, instant messaging and real-time event notification. SIP is implemented on top of UDP or TCP, and does not support HTTP session continuity. Therefore, a transparent, extensible session-layer architecture, e.g. an interposition toolkit for generic session-layer network services, must be provided to address the end-to-end session migration for mobility across network disconnects and to provide for automatic failure recovery in the presence of network handoffs. This additional layer resides between the application-layer and the network-layer. A major disadvantage of this approach is that existing software applications must be modified to take advantage of the built in functions of SIP, and must be recompiled with a special library (software library module). This is impractical for several reasons, including the inability to access software source code so that modifications can be made, and the inability to convince the software owners to make the modifications themselves.

There are several disadvantages related to the use of MIP and SIP in heterogeneous network environments. In particular, as noted above, access to a full range of wireless networks must be available. This may not be feasible because service providers are reluctant to allow access to their networks, and because a vertical handoff normally takes more than 20 seconds, causing an unrecoverable TCP failure. Further, in a standard MIP system architecture, both FA and HA are required to be in the same network domain. Therefore, vertical handoff will not work if HA and FA are in different network domains, primarily because of the presence of network firewalls. Similarly, standard SIP protocol assumes that the SIP user agent and SIP proxy are in the same network domain. The presence of firewalls makes both SIP and MIP virtually useless for heterogeneous network environments consisting of different networks owned by different network operators, without specific business and technical arrangements allowing traffic to flow freely between the two networks.

Moreover, vertical handoff requires that a HA be able to multicast data packets to a group of base stations in which the FA resides. Firewalls and other service provider issues may constrain such multicasting. These disadvantages highlight the importance of carrier-independent solutions. In addition, for in-vehicle applications, other problems must be overcome, including transient network failures and disconnects which result from the existence of blind coverage spots and vehicle speed.

One problem arises from the fact that web servers are intrinsically stateless and each request is processed without any knowledge of previous requests. As a result, any network failure will disrupt an ongoing HTTP sessions and require the user to manually reestablish a connection to the same server. This is tolerable in the wired network, but it is not feasible for the wireless in-vehicle environment for several reasons. In particular, the current systems for the wireless in-vehicle environment do not provide for automatic failure recovery with minimum human intervention. Further, the current systems require a complete reload of a file following a network disconnect, and do not allow the affected HTTP session to be restarted from the point of disconnect. In addition, current systems do not possess network environment awareness and therefore can not overcome the problem of network hysteresis noted above.

Therefore, there remains a need in the art for improvements in the field of in-vehicle wireless technology.

SUMMARY

The present invention provides a system and architecture for enabling in-vehicle wireless use. In particular, the present invention provides a system for in-vehicle wireless application that has network awareness and the ability to adapt to a dynamically changing heterogeneous network environment. The system of the present invention is both carrier-independent and access transparent. These preferences are achieved in the present invention by providing features, including; HTTP session continuity and automatic HTTP failure recovery; network environment awareness; and application-level preemptive handoff based on bandwidth capacity.

DETAILED DESCRIPTION OF THE INVENTION

The present invention provides a system and architecture for enabling in-vehicle wireless use. In particular, the present invention provides a system including the following features; network environment awareness; HTTP session continuity and automatic HTTP failure recovery; and application-level preemptive handoff based on bandwidth capacity.

Network awareness is a key issue arising from network heterogeneity. To address the problem of the network hysteresis noted above, the present invention carries out a preemptive handoff having the ability to automatically relinquish a lower-bandwidth connection and reestablish a higher-bandwidth connection in the presence of multiple networks. This preemptive handoff should not be confused with a vertical or horizontal handoff as the objective is entirely different. The goal of horizontal or vertical handoff is to ensure network connectivity in mobile environments, while the goal of preemptive handoff, according to the present invention is to optimize system performance. The preemptive handoff of the present invention is implemented at the application layer rather than the network or link layer and has the main goal of overcoming network hysteresis in heterogeneous environments, with the objective of fully utilizing the available resources and maximizing system performance. The present invention provides an architectural framework which provides the following attributes.

The architecture of the present invention supports HTTP session continuity in the presence of handoffs. Further, the architecture of the present invention supports a system that is capable of both network awareness and network adaptation. The system of the present invention is carrier-independent, access transparent, scalable, extensible and provides for automatic and speedy HTTP failure recovery. The system of the present invention may be built on top of commercially available operating systems such as Windows 2000 server and Windows XP.

Figure 1:
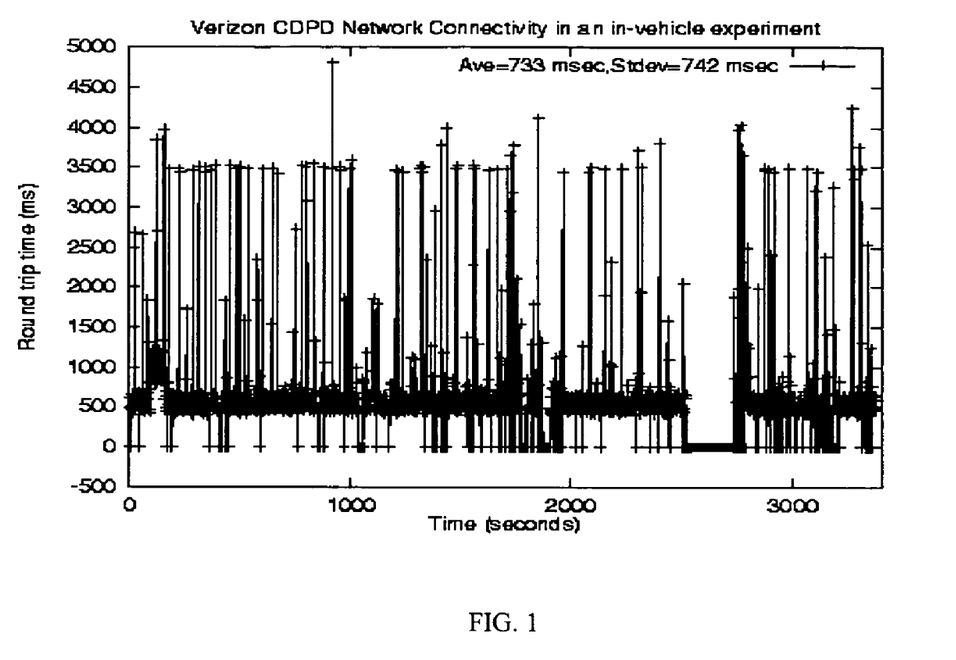
FIG. 1 is a graph of results related to the effect of speed on network connectivity and system throughput.
Figure 2:
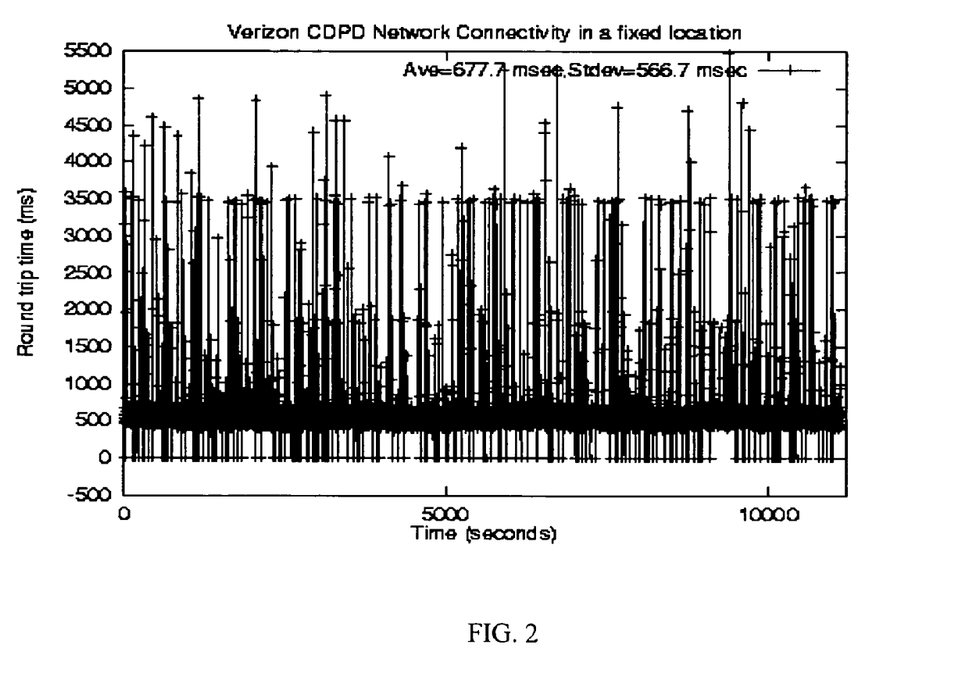
FIG. 2 is a further graph of results related to the effect of speed on network connectivity and system throughput.
Figure 3:
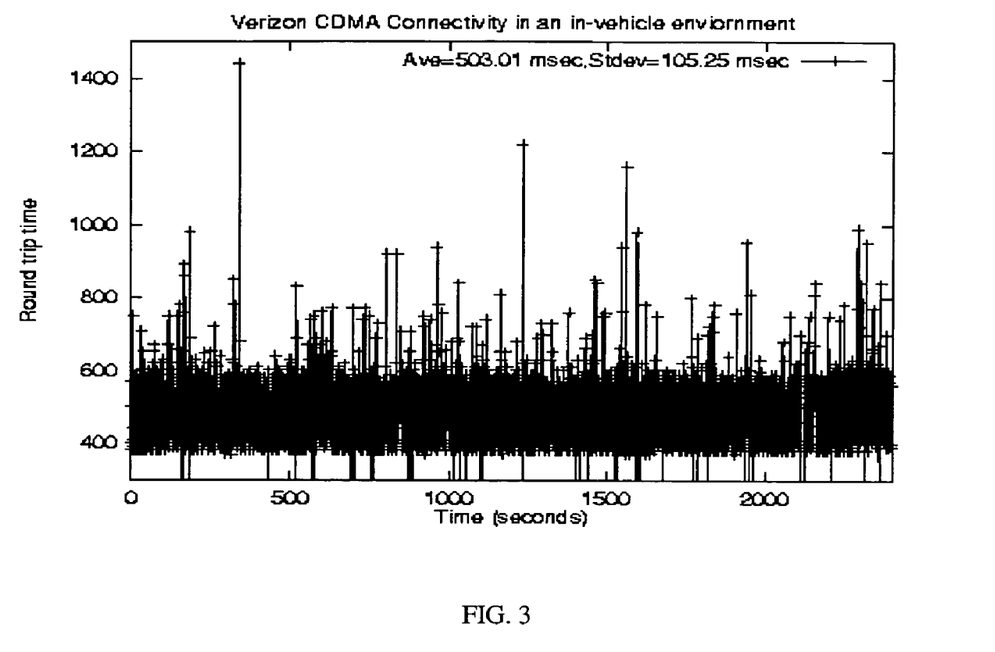
FIG. 3 is another graph of results related to the effect of speed on network connectivity and system throughput.
Figure 4:
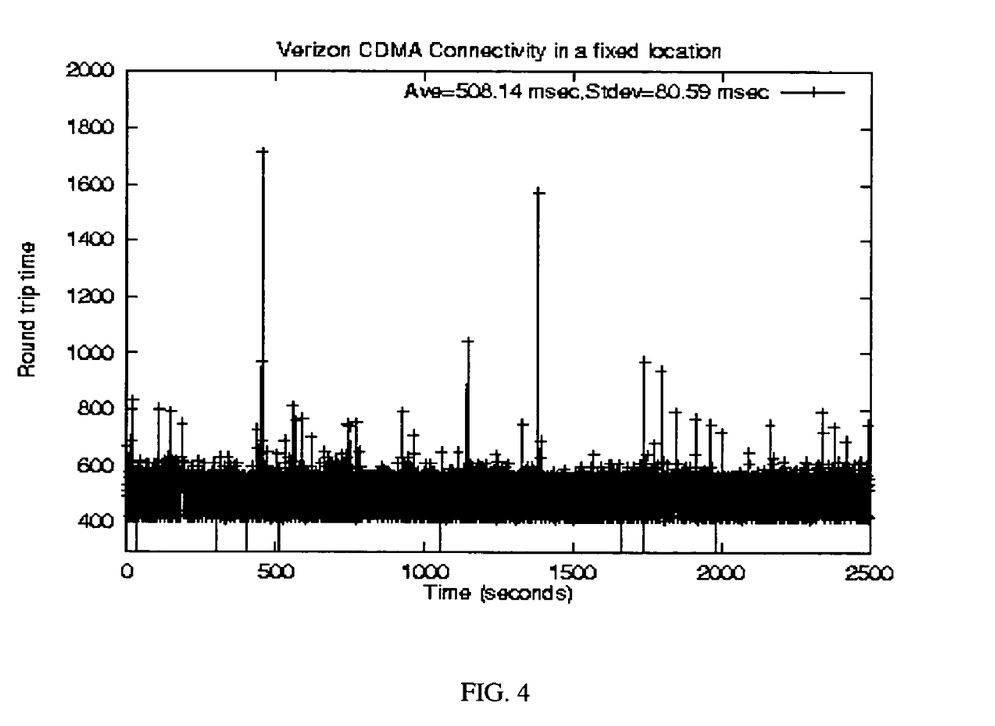
FIG. 4 is an additional graph of results related to the effect of speed on network connectivity and system throughput.

To investigate the effect of speed on network connectivity and system throughput, the following experiment was conducted. A ICMP-based probe with packet size of 64 bytes polled www.yahoo.com continuously via service provider CDPD and CDMA 1×RTT networks respectively, and the round-trip time (RTT) of each probe was measured. FIG. 1 and FIG. 3 show the results obtained from 45-minute drive time during rush hour. FIG. 2 and FIG. 4 show the results obtained from a fixed-location test. In each of FIGS. 1, 2, 3 and 4, transient network disconnects were represented by zero round trip time for better visualization. This experiment showed that for CDPD out of a total 1689 samples taken, 203 packets (12%) were dropped for the in-vehicle test, compared with the 194 dropped packets (3%) out of a total 5567 samples taken in the fixed location. For CDMA, 58 packets (2.4%) were dropped out of a total 2401 samples taken for the in-vehicle test, compared with 9 dropped packets (0.3%) out of a total 2500 samples taken in the fixed location. In addition, for the in-vehicle CDPD test, 97 probes (5.74%) had no network connectivity because of the existence of blind coverage during driving. After removing both dropped packets and no-connect packets, the mean and standard deviation were used to measure network performance as shown in Table I.

TABLE I

Connectivity In Fixed-Location And In-Vehicle Environments

|  | CDPD | | CDMA | |
| --- | --- | --- | --- | --- |
|  | Mean | Stdev | Mean | Stdev |
| in-vehicle | 733 ms | 742 ms | 503 ms | 105 ms |
| Fixed-location | 677 ms | 566 ms | 508 ms | 81 ms |

The increased standard deviation of RTT in both CDPD and CDMA tests as shown in Table I, suggest that speed introduces an additional delay variable and a possible cause of connectivity unreliability and performance deterioration. This experiment illustrates the importance of automatic failure recovery and HTTP session continuity even for pure cellular networks such as CDMA or CDPD networks. Both vehicle speed and blind coverage spots in cellular networks introduce additional sources of unreliability that could result in transient network disconnects, making the need for transparent and efficient automatic failure recovery even more important for in-vehicle environments.

Figure 5:
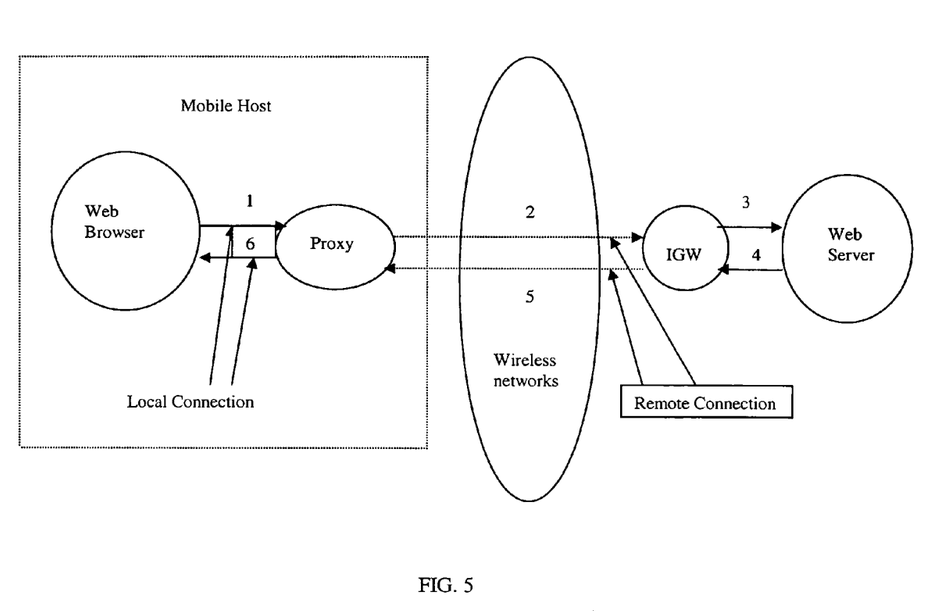
FIG. 5 is an illustration of the system architecture according to the present invention.

The system architecture of the present invention is shown in FIG. 5. To achieve the goal of web access transparency, the present invention provides a multi-tiered architecture that transparently interposes itself between the web browser and the web server. As shown in FIG. 5, this architecture includes a client-side proxy and an information gateway (IGW) interposed between the web browser and web server. The addition of the client-side proxy and the IGW provides a shield that ensures HTTP session continuity without requiring modification of the existing web server and web browser. This enhances overall system robustness and helps reduce HTTP session disruption caused by transient network disconnects. FIG. 5 shows a general processing flow in accordance with the present invention. Upon receipt of a request from the web browser, the proxy splits the request into two separate HTTP connections, one with the web browser (path 1) and the second with the IGW (path 2) and then redirects the request to the IGW. The IGW then forwards the request to an origin web server (path 3) and the web server sends a response to the IGW (path 4). The response is forwarded by the IGW to the proxy (path 5) and finally to the web browser from the proxy (path 6). In the architecture according to the present invention, the proxy performs as a web server for the web browser and as a web client for the web servers, thus creating two separate and independent HTTP connections. The local connections (paths 1 and 6) between the proxy and the web browser are immune from network failures, while the remote connections (lines 2 and 5) between the proxy and IGW are vulnerable to network failures. However, by virtue of the proxy splitting the connection, user-perceived HTTP session continuity is provided. In particular, the persistent local connection between the proxy and the web browser remains intact and visible to the user despite any failures in the remote connection. In this fashion such remote failures become transparent to the user. Further, system resilience is achieved by the architecture of the present invention, by the ability to automatically restore the remote connection after a handoff occurs, as will be described in more detail below.

Figure 6:
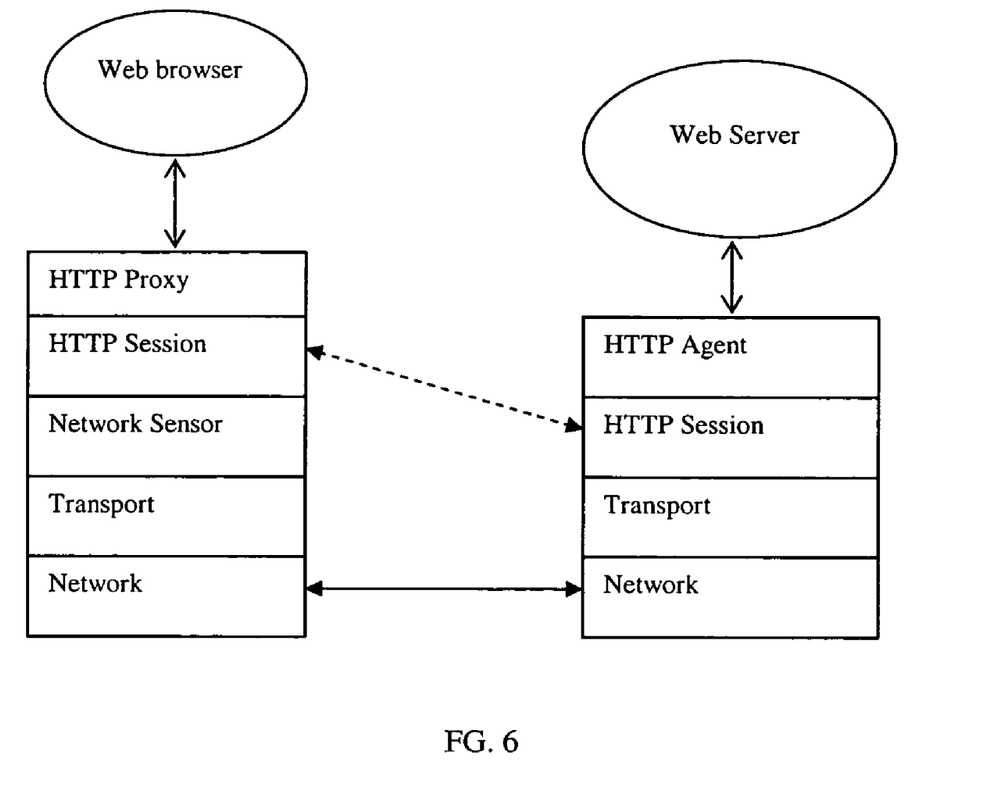
FIG. 6 is an illustration of the architecture for two elements of the system according to the present invention.

As shown in FIG. 6, the system of the present invention is structured into hierarchy functional layers. The client-side proxy subsystem is implemented through the layering of five types of technologies, and the IGW subsystem is implemented through the layering of four types of technologies, as discussed in more detail below. This layering of functionality provides flexibility to the system by allowing addition of new layers without requiring significant rewrite of the infrastructure to support the change. This approach, according to the present invention, is very different than existing protocols, such as FTP restart option and HTTP 1.1, because the emphasis of the present invention is on system architecture rather than protocol.

Figure 7:
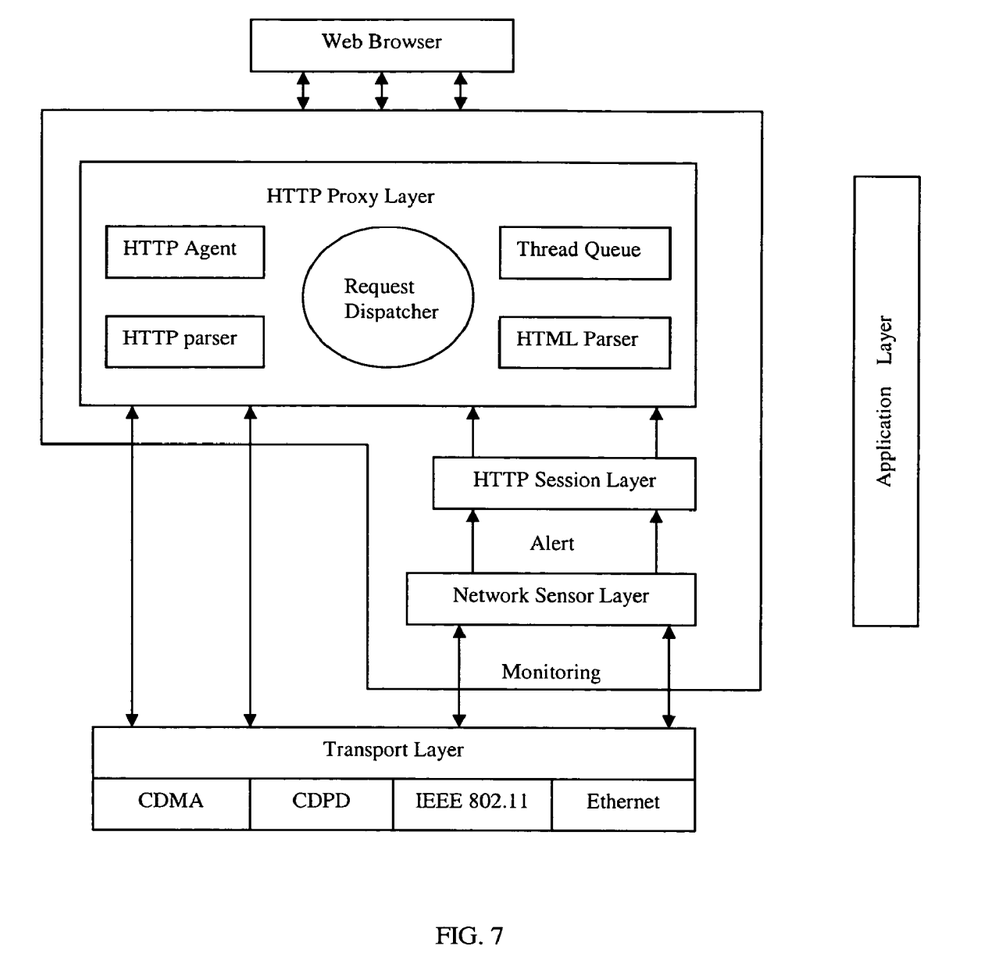
FIG. 7 is an illustration of the architecture for the mobile host component of the system according to the present invention.

The system architecture of the layered MH is shown in more detail in FIG. 7. The network sensor layer at the MH provides network-awareness capability and a means to inform the HTTP session layer of a change of network conditions. The ability to timely discern changes in network conditions and know the root cause of such changes is a necessary feature in achieving a network-awareness capability. The changes of network conditions are random and detection of such changes is time dependent and event dependent. Detection of changes can be accomplished by a number of different mechanisms and means, including basic application-layer mechanisms for detecting changes of network conditions; e.g. event-driven schemes and polling-based schemes. These two schemes are complementary and may be used in parallel but serve distinctly different roles in detecting various types of network failures.

An event-driven scheme is used to capture various network events during the course of an ongoing HTTP session. For example, socket object may be used to discern various network events during the course of HTTP sessions because network events are socket-related. In particular, an exception of socket object will be raised whenever a network event (failure) occurs during a session. The present invention takes advantage of the exception handling mechanism and return status to capture various run-time network failures and to identify the root cause of such failures.

A polling-based scheme is used to collect the overall network conditions via a periodic polling of the network interfaces. This is particularly useful for detecting changes of network conditions involving multiple network interfaces.

For example, an asynchronous thread-based poller that periodically invokes the WSAIoctl function defined in Microsoft Platform SDK with SIO GET INTERFACE LIST option to retrieve network interface information on the MH can be used. Detecting changes to overall network conditions is done by comparing the current status with a previous status, and a notification is then sent to the HTTP session layer providing information about the change.

For polling-based schemes, a detection delay is the time delay between when a change of network occurs and when the change is detected and serves as an important metric for measuring the system responsiveness to the changes of network conditions. It is important to set the polling interval appropriately for optimization. In particular, a decreased detection delay is associated with the increased polling frequency, while excessive polling could take up run-time kernel resources, serving as an upper bound for the detection delay.

In accordance with the present invention, both an event-driven scheme and a polling-based scheme are used in conjunction, as part of the network sensor layer of the client side proxy, to ascertain network conditions and to provide network awareness capabilities. By identifying the root cause of network failures via an event-driven scheme and collecting overall network conditions via a polling-based scheme, the system of the present invention is aware of network capabilities and can take advantage of more favorable conditions. In this way, the present invention overcomes the problem of network hysteresis.

The HTTP session layer, as shown in FIGS. 6 and 7, exists in both the MH and IGW, the two components coordinating to keep track of HTTP sessions, including the byte-count of each ongoing session. The byte-count information is used as the offset to establish a connection to the IGW in the case of handoffs. The byte-count is crucial information needed for efficient failure recovery. The byte-count information is used to determine how many bytes have been received for each ongoing HTTP session. In the event of network failure, such as a network handoff, the byte-count information is sent by the proxy to the IGW, and the IGW is then able to pick up where it left off when the network failure occurred. In this way, a full content reload can be avoided.

The HTTP proxy layer, shown in FIG. 7, of the MH provides web access transparency and support to HTTP session continuity during handoffs. As noted above, each HTTP request originating from the web browser is split into two separate HTTP connections; local and remote connections, providing a clean separation of local and remote HTTP sessions, and allowing graceful handling of network failures while maintaining user-perceived HTTP continuity. In addition, the HTTP proxy layer ensures HTTP session continuity in the presence of handoffs and optimizes the over-the-air efficiency by exchanging the byte-count information with the IGW. As a result, the IGW is able to pick up where it left off following a failure. This has the benefit that failure recovery is completely transparent to the user.

Figure 14:
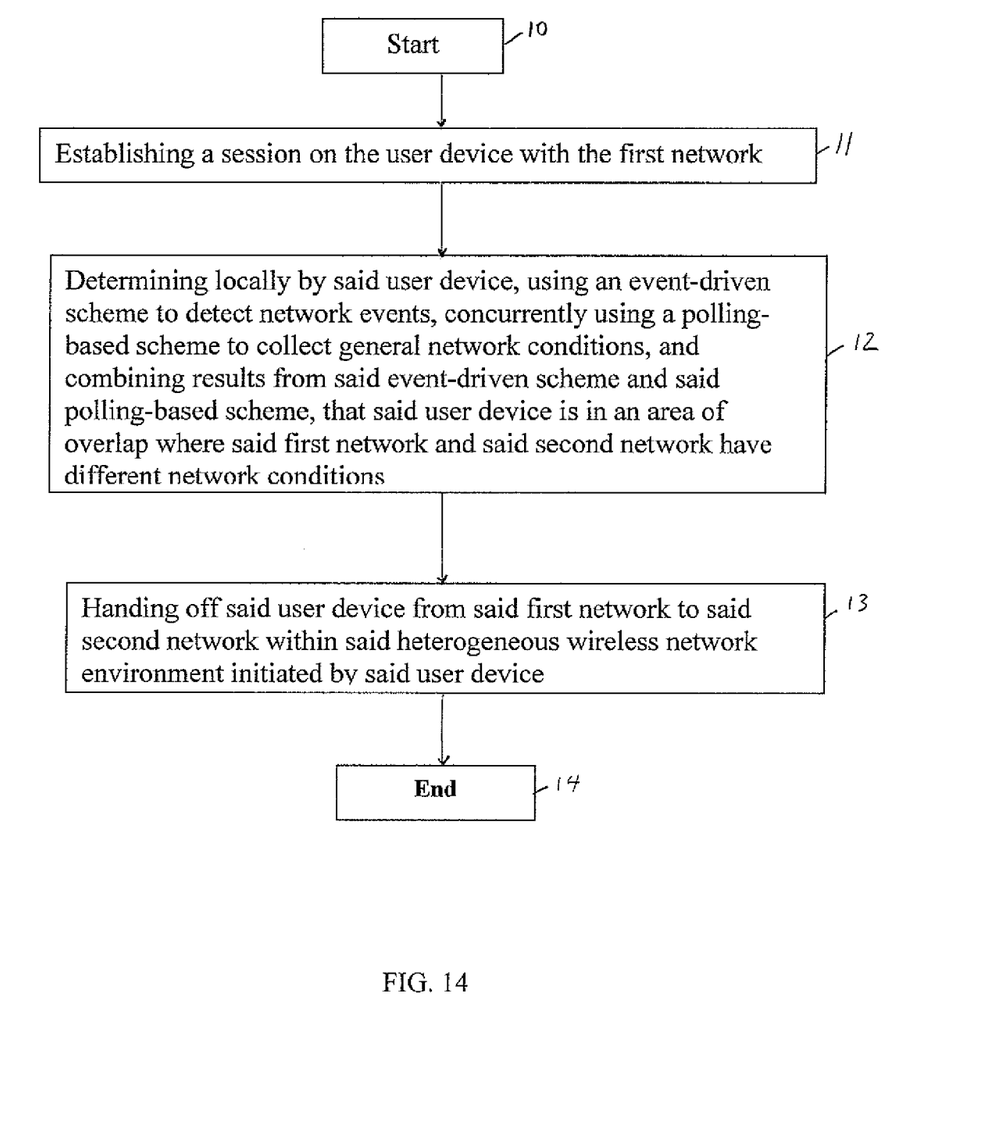
FIG. 14 is flow chart of a method of the present invention.

FIG. 14 is a flow chart of a method of handing off a user device from a first network to a second network in a heterogeneous wireless network environment starting 10 by establishing a session on a user device with a first network 11. The next step is determining locally by the user device, using an event-driven scheme to detect network events, concurrently using a polling-based scheme to collect general network conditions, and combining results from the event-driven scheme and the polling-based scheme, that the user device is in an area of overlap where the first network and the second network have different network conditions 12. The next step is handing off the user device from the first network to the second network within the heterogeneous wireless network environment initiated by the user device 13. Then the method ends 14.

The architecture of the present invention provides the system with network awareness capability; and thus the system according to the present invention can be made aware when a higher bandwidth becomes available. Then the system according to the present invention may perform a preemptive handoff, as a function built into the proxy, to switch to the higher bandwidth. In this fashion, the system of the present invention overcomes the problems associated with network hysteresis. Therefore, the system of the present invention allows for faster file downloading in heterogeneous network environments, especially of large sized files.

It should be noted that while the present invention has been described in terms of HTTP protocol, the present invention is equally applicable to other areas and protocols, such as SMTP, POP3, IMAP and streaming-based protocols.

To test the system according to the present invention, the following environment was created. The proxy and IGW systems consisted of roughly 20,000 and 8,000 lines of Microsoft Visual C++ source code, respectively. On the MH, approximately 10,000 lines of code are GUI related, with the remaining lines of code written specifically to thread pool, HTTP parser/session management, and network awareness. On the IGW, the lines of code primarily deal with database access, CGI parser, and HTTP session management. The testbed consisted of two Toshiba Tecra laptops (MHs) running Microsoft XP operating system and one Dell OptiPlex desktop (IGW) running Microsoft 2000 server. Each Toshiba laptop had 1 GB main memory with an Intel Pentium III 1.2 GHz Mobile CPU and built-in Wi-Fi (11 Mbps). This model has a switch below the keyboard on the front, which can be used to turn the WLAN card on and off. In addition, a Verizon CDMA driver with the Sierra wireless AirCard 550 with maximum capacity of 550 Kpbs was installed. The Dell OptiPlex desktop had 192 MB main memory with x86 family 6 Model CPU, and was accessible both from the CDMA network over 17 hops or from the WLAN over 2 hops. The routing cost metrics for the Ethernet, WLAN and CDMA interfaces were set as 1, 2, and 5, respectively. As a result, the network interface with lower cost metric will be selected in the presence of multiple network interfaces.

To compare performance with and without preemptive handoff, a series of experiments under different network settings was conducted. This test also determined the impact of network hysteresis on system throughput. To simulate the intermittent WLAN connectivity in a repeatable fashion, the experiment was conducted in a location with a good reception of the CDMA network.

Both a system without network-aware capability and a prototype system with network-aware capability using the CDMA/WLAN and CDMA/Ethernet heterogeneous networks, respectively were tested. In the experiment, a higher-bandwidth network such as WLAN or Ethernet is enabled 30 seconds after a HTTP session is initiated over the CDMD network, which mimics a scenario in which the MH moves from the coverage area of a CDMA network into an overlapping coverage area by both CDMA and Ethernet or WLAN. This was accomplished by either by manually plugging an Ethernet cable into the wired network or by turning on the MH's WLAN card. For this experiment, a fixed IP address was used for the WLAN connection and a dynamically-assigned IP address was used for the Ethernet connection. As shown in Table II, overall download time and detection delay were measured and compared.

TABLE II

Performance Comparison

| without preemptive | | preemptive CDMA-WLAN | | preemptive CDMA-Ethernet | |
|---|---|---|---|---|---|
| Mean | Stdev | Mean | Stdev | Mean | Stdev |
| Overall Download Time | | | | | |
| 521.4 s | 59.13 s | 41.3 s | 6.34 s | 43.0 s | 2.94 s |
| Detection Delay | | | | | |
| — | — | 2.2 s | 0.24 s | 6.3 s | 2.6 s |

Figure 8:
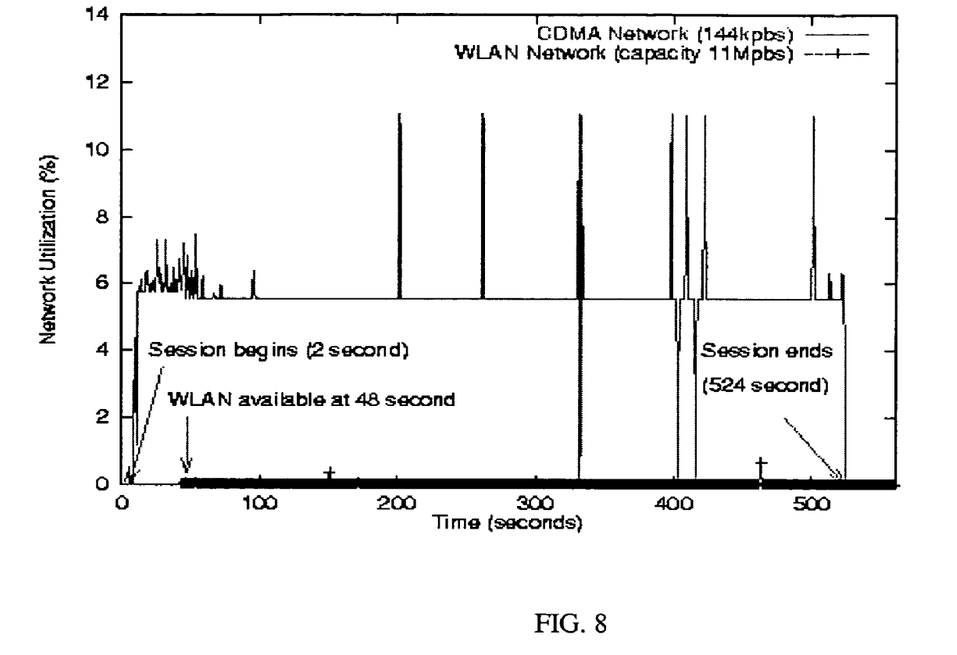
FIG. 8 is a graph of experimental results showing the effect of network hysteresis.

In conjunction with the results of Table II, FIG. 8 presents a chart of real-time network utilization of the CDMA and the WLAN in the entire period of a HTTP session. Without network-aware capability, the established CDMA connection (HTTP session) is persistent until the file has finished downloading despite the presence of a higher bandwidth network during the session, taking up 521 seconds on average to download a 500K powerpoint file over the CDMA network. As noted earlier, network hysteresis prevents the MH from taking advantage of the available higher bandwidth network resource.

Figure 9:
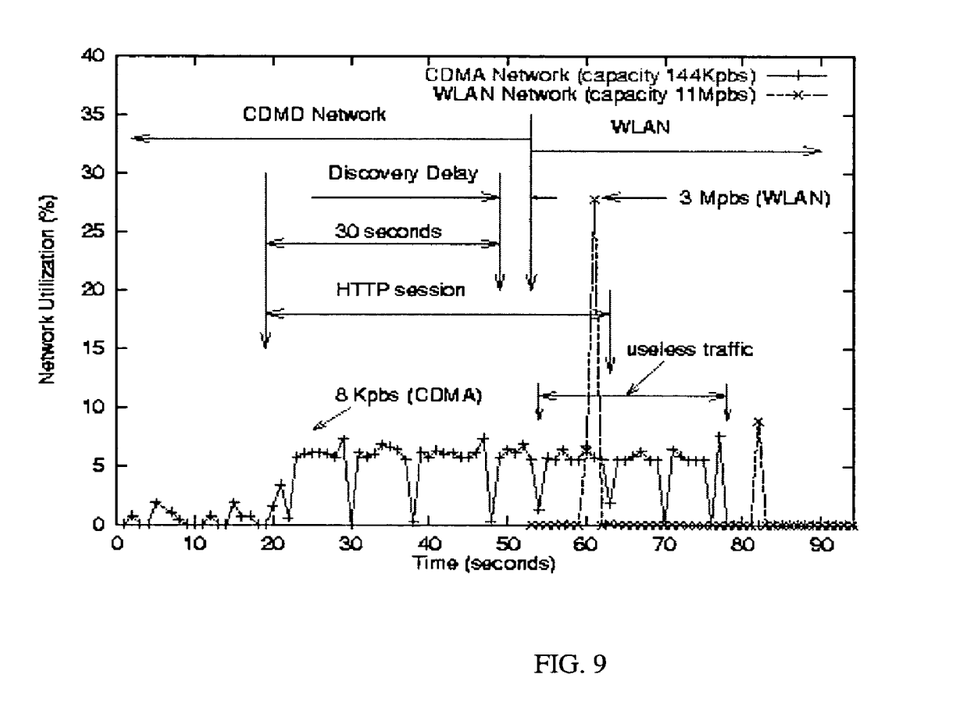
FIG. 9 is a graph of experimental results showing the effect of a preemptive handoff between CDMA and WLAN in accordance with the present invention.
Figure 10:
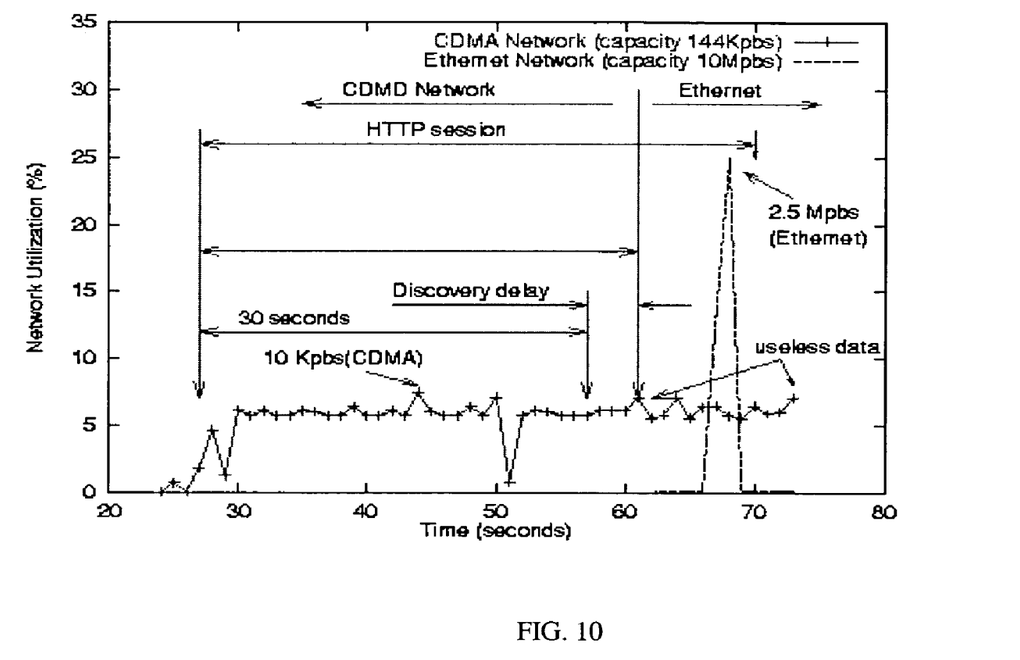
FIG. 10 is a graph of experimental results showing the effect of a preemptive handoff between CDMA and Ethernet in accordance with the present invention.

However, as shown in FIG. 9, using the MH according to the present invention, enhanced with the network-aware capability, handoff to the higher bandwidth WLAN occurs quickly and the CDMA session is relinquished. Similarly, an early transfer to an Ethernet connection can be accomplished as shown in FIG. 10.

It was observed that a delay of a few second is needed before a preemptive handoff takes place. This delay (see Table II) is attributed to the period of time required by the OS to generate the connect event as well as time to acquire a dynamically assigned IP address by a DHCP server.

Further, an overlapping time interval exists in which data packets continue to flow through the CDMA network interface (data marked as useless in FIGS. 9 and 10) after the MH has actually closed a CDMA connection and reestablished a WLAN or Ethernet connection. This phenomenon is associated with the implementation of TCP Time-Wait, and is best explained in TCP protocol documentations RFC 793 and RFC 1337.

Table II provides the average and standard deviation of 10 independent trials, showing that in general the preemptive handoff significantly improves system throughput in a heterogeneous environment where two networks with high bandwidth differential are involved.

Figure 11:
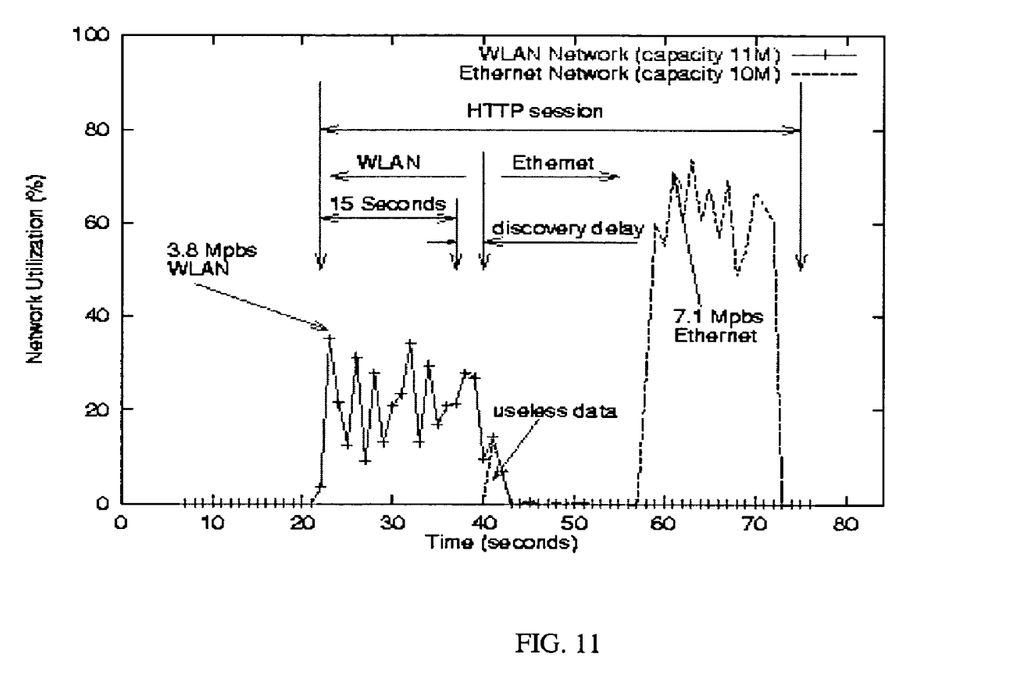
FIG. 11 is a graph of experimental results showing the effect of a preemptive handoff between WLAN and Ethernet in accordance with the present invention.

However, the performance advantage of preemptive handoff might be diminished or become negative if two participating networks have comparable bandwidth. Therefore, a further experiment was conducted using a 23M file in the WLAN/Ethernet network environment. A preemptive handoff (by manually plugging an Ethernet cable into the wired network) was triggered 15 seconds after a HTTP session was initiated over the WLAN network. The diminishing effect of preemptive handoff is measured and listed in Table III and a chart of network utilization is shown in FIG. 11. As is evident, the preemptive handoff actually degraded performance. This is because the preemptive handoff indeed incurs a few seconds of delay. Therefore, it was concluded that the extent of performance gain of the preemptive handoff depends on the number of factors; including the degree of asymmetry of bandwidth of participating networks; the remaining size of download file; and handoff time.

TABLE III

Diminishing Benefit of Preemptive Handoff

| WLAN | | Ethernet | | Preemptive WLAN-Ethernet | |
|---|---|---|---|---|---|
| Mean | Stdev | Mean | Stdev | Mean | Stdev |
| 41.3 s | 6.34 s | 33.7 s | 1.13 s | 44.8 s | 2.45 s |

It was observed that the MH takes more than 10 seconds to capture the event when the WLAN card has been shut down manually (FIG. 11), while it only takes the MH about 2 seconds to capture the event when the WLAN card has been manually turned on (FIG. 9). This is consistent with Microsoft design guidance which state the NIC needs to wait 10 seconds before generating any disconnect event and the connect event must be generated within 2 seconds. The application-layer approach of the present invention can not control the OS kernel to improve system response to such events, however, the present invention remains useful for network disconnects that last more than ten seconds.

A further experiment was conducted to test the resilience of the prototype system of the present invention to random transient network disconnects. In this experiment, a long-lived HTTP session downloading a 6M powerpoint document from the IGW via a WLAN network was disrupted by artificially inserting a random network failure. Three cases were studied. As a baseline comparison, the first case measured the download time of the 6M file via the WLAN without network failure. In the second case, a random network failure is generated by manually turning the AP's power off, then turning the AP's power on. In the third case a random network failure is created by manually turning off the MH's WLAN card, followed by turning on the MH's WLAN card. The download time of the 6M file was measured for each case by either using dynamically assigning IP address via DHCP server or static IP address. Table IV summarizes the experimental results in terms of the mean and standard deviation of 10 independent trials.

TABLE IV

Impact of Transient Failures

| No disruption | | AP power off-on | | WLAN off-on | |
|---|---|---|---|---|---|
| Mean | Stdev | Mean | Stdev | Mean | Stdev |
| Fixed IP Address Overall Download Time | | | | | |
| 12.3 s | 3.16 s | 101.9 s | 3.93 s | 43.5 s | 3.69 s |
| | | Network Disconnect Time | | | |
| — | — | 86.0 s | 4.21 s | 25.3 s | 4.4 s |
| Dynamically Assigned IP Address Overall Download Time | | | | | |
| 12.3 s | 3.16 s | 101.7 s | 1.77 s | 97.1 s | 23.5 s |
| | | Network Disconnect Time | | | |
| — | — | 84.7 s | 3.86 s | 74.7 s | 17.7 s |

Figure 12:
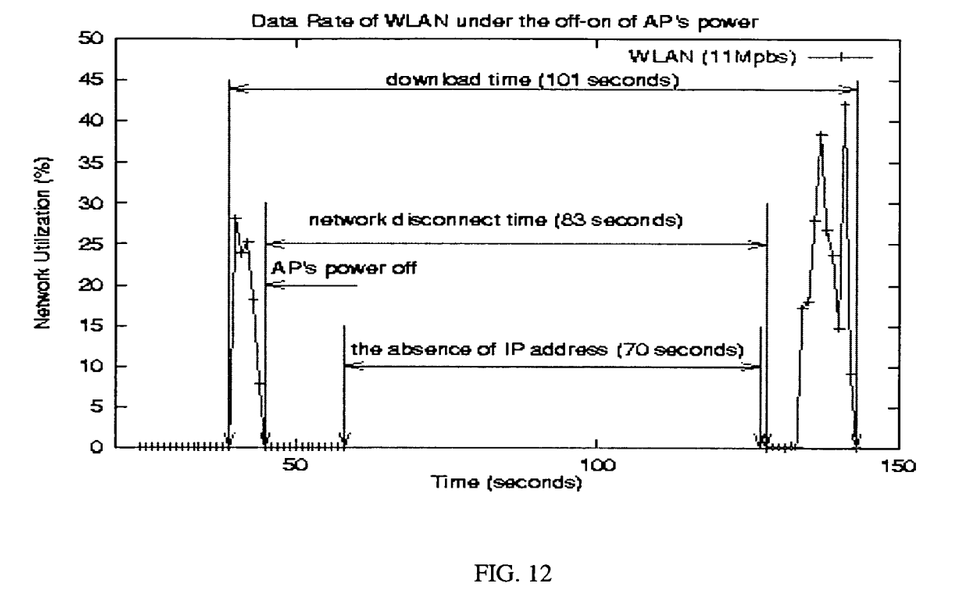
FIG. 12 is a graph of experimental results showing the effect of a induced network failure in accordance with the present invention.

This experiment proves that the prototype system according to the present invention can survive long network disconnects triggered by manually turning off the MH's WLAN card or the AP's power. It can be seen in Table IV and FIG. 12 that even though network disconnect time lasts up to 86 seconds, the prototype system is able to automatically resynchronize with the IGW and recover the HTTP session once network connectivity is reestablished while maintaining user-perceived HTTP session continuity.

To evaluate the ability of the prototype system of the present invention to be handle handoff between two WLAN subnets, a further experiment was conducted to measure network handoff delay and detection delay. In particular, two access points (WP-II E made by Lucent Technologies) were set up in the testbed and each access point (AP) was connected to an IP subnet, with the beacon frequency of the APs being configured at 1 second. A MH running Microsoft XP was configured to have access to both IP subnets via a DHCP server, i.e. the MH is located in the overlapping coverage area of both APs, with one AP being configured as the preferred and the other as backup. A long-lived HTTP session (downloading a 23M powerpoint file) via the preferred AP was initiated and then a handoff was triggered by turning off the AP's power, thus forcing the MH to change its point of attachment from the preferred AP to the backup AP. This is a break-before-make handoff, i.e., during a handoff the MH cannot communicate simultaneously with both the preferred AP and the backup AP. As a result, data packets traveling through the preferred AP are immediately cut off when its power is off, serving as a starting point for measuring the handoff delay.

Figure 13:
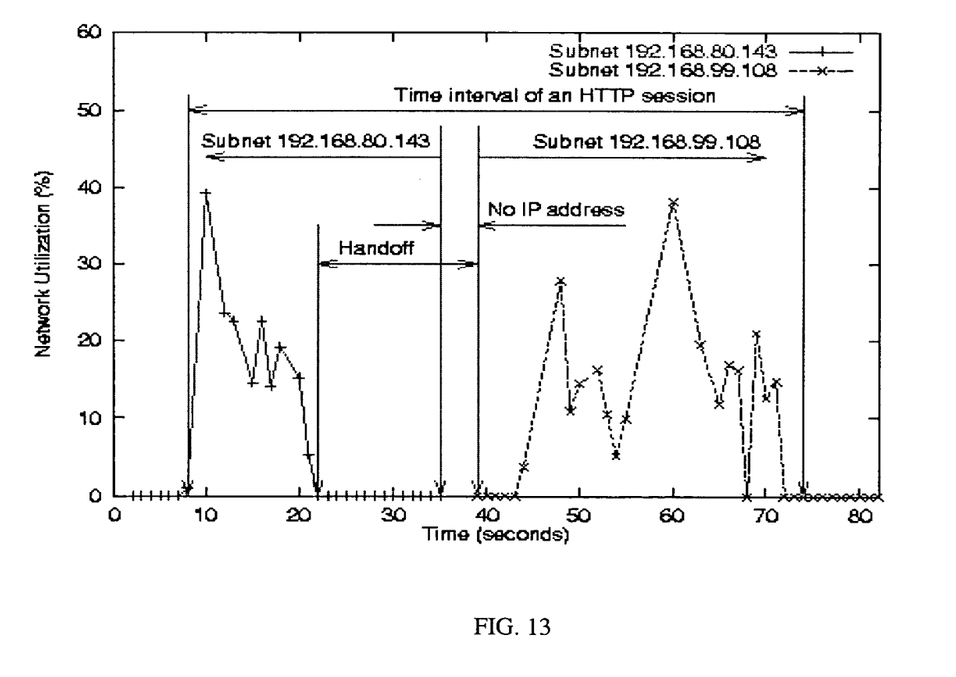
FIG. 13 is a graph of experimental results showing the effect of handoff between WLAN subnets in accordance with the present invention.

The handoff delay is composed of two parts; network handoff delay and detection delay. Network handoff delay is defined as an interval between when the rate of data packets associated with the preferred AP drops to zero and when the MH has attached to the backup AP. Detection delay is defined as an interval between when the MH has attached to the backup AP and when the MH starts receiving and transmitting data packets via the backup AP. By examining the IP packet traces, the network handoff delay and the detection delay can be precisely measured. Table V and FIG. 13 summarize the measurement results of 10 independent tests, indicating that a handoff across different subnets could cause a 65% additional delay for downloading the 23M file.

TABLE V

Performance Comparison

| Overall Download Time | | | |
|---|---|---|---|
| No handoff | | One handoff | |
| Mean | Stdev | Mean | Stdev |
| 41.3 s | 6.343 s | 67.0 s | 3.25 s |
| | | Network Handoff Delay | |
| Overall Download Time | | | |
| No handoff | | One handoff | |
| Mean | Stdev | Mean | Stdev |
| 41.3 s | 6.343 s | 67.0 s | 3.25 s |
| | | Network Handoff Delay | |
| No handoff | | One handoff | |
| Mean | Stdev | Mean | Stdev |
| — | — | 17.4 s | 3.4 s |
| | | Detection Delay | |
| No handoff | | One handoff | |
| Mean | Stdev | Mean | Stdev |
| — | — | 2.2 s | 0.42 s |

These experimental results highlight the importance of implementing a resilient system in order to survive long handoffs and demonstrates the ability of the prototype system of the present invention to uniformly handle both vertical and horizontal handoffs. In particular, since the system of the present invention is implemented at the application layer, rather than the network layer or link layer, both vertical and horizontal handoffs are treated equally and indistinguishably. In other words, network handoff, transient network failure and even system failure are all considered events that are then uniformly handled. The ability to survive long handoffs, e.g. more than 20 seconds in the experimental study, is attributed to splitting of the HTTP connectivity, by the proxy, that allows independent treatment of local and remote HTTP connections. As a result, user-perceived HTTP session continuity is maintained by the local HTTP connection and failure recovery is achieved by reestablishing HTTP connectivity to IGW in the event of network failures.

The system according to the present invention solves many of the problems associated with preserving HTTP sessions in heterogeneous wireless environments. In particular, by creating a system that has network awareness, the problems associated with network hysteresis are overcome. Further, spitting of the HTTP connection allows the network failure recovery to be both automatic and transparent to the user. Moreover, the problems associated with MIP and SIP firewalls are avoided because the solution according to the present invention is applied at the application layer.

It is anticipated that other embodiments and variations of the present invention will become readily apparent to the skilled artisan in the light of the foregoing description and examples, and such embodiments and variations are intended to likewise be included within the scope of the invention as set out in the appended claims.

What is claimed is:

1. A computer readable medium having computer readable program for operating on a computer said program comprising instructions that cause the computer to perform as a proxy for use with a user device operating in a heterogeneous wireless network environment, said program comprising instructions that cause the computer to perform the steps of:
    determining locally by concurrently combining both event-driven and polling-based schemes by said user device that said user device is in an area of overlap by where there are changed network conditions within said environment; and
    handing off said user device from a first network to a second network within said heterogeneous wireless network environment.

2. The computer readable medium as set forth in claim 1, wherein said second network operates at a higher bandwidth than said first network.

3. The computer readable medium as set forth in claim 1, the program further comprising the step of tracking an ongoing session by said user device.

4. The computer readable medium as set forth in claim 3, wherein said tracking is byte counting.

5. The computer readable medium as set forth in claim 3, wherein said session is a SMTP session, a POP3 session, an IMAP session, or a streaming session.

6. A method of handing off a user device from a first network to a second network in a heterogeneous wireless network environment, said method comprising:
    establishing a session on said user device with said first network;
    determining locally by said user device, using an event-driven scheme to detect network events, concurrently using a polling-based scheme to collect general network conditions, and combining results from said event-driven scheme and said polling-based scheme, that said user device is in an area of overlap where said first network and said second network have different network conditions; and handing off said user device from said first network to said second network within said heterogeneous wireless network environment initiated by said user device.

7. The method according to claim 6, wherein said second network operates at a higher bandwidth than said first network.

8. The method according to claim 6, further including the step of tracking a byte count of said session.

9. The method according to claim 6, wherein said session is a SMTP session, a POP3 session, an IMAP session, or a streaming session.

10. An architecture for use in a heterogeneous wireless network environment, said architecture comprising:
   a user device having an installed web browser;
   a web server;
   a computer readable medium having computer readable program for operating on a computer said program comprising instructions that cause the computer to perform as a proxy interposed between said web browser and the heterogeneous wireless network environment;
   said program comprising instructions that cause the computer to perform the steps of:
   determining by concurrently combining both event-driven and polling-based schemes that said user device is in an area of overlap where there are changed network conditions within said environment; and
   handing off said user device from a first network to a second network within said heterogeneous environment initiated by said proxy disposed in said user device; and
   an information gateway interposed between the heterogeneous wireless network environment and said web server.

11. The architecture according to claim 10, wherein said second network operates at a higher bandwidth than said first network.

12. The architecture according to claim 10, wherein said program further includes the step of tracking an ongoing session by said user device.

13. The architecture according to claim 12, wherein said tracking is byte counting.

* * * * *

UNITED STATES PATENT AND TRADEMARK OFFICE
CERTIFICATE OF CORRECTION

PATENT NO.       : 7,567,809 B2                                Page 1 of 1
APPLICATION NO.  : 11/384590
DATED            : July 28, 2009
INVENTOR(S)      : Ling et al.

It is certified that error appears in the above-identified patent and that said Letters Patent is hereby corrected as shown below:

In the Drawings

In Fig. 9, Sheet 6 of 9, delete "CDMD Network" and insert -- CDMA Network --, therefor.

In Fig. 10, Sheet 7 of 9, delete "CDMD Network" and insert -- CDMA Network --, therefor.

Signed and Sealed this
Eighteenth Day of November, 2014

Michelle K. Lee
*Deputy Director of the United States Patent and Trademark Office*